United States Patent
Ki

(10) Patent No.: US 6,715,015 B1
(45) Date of Patent: Mar. 30, 2004

(54) APPARATUS AND METHOD FOR GENERATING COMMAND AND/OR RESPONSE FRAME FOR CONTROL OF DIGITAL EQUIPMENT

(75) Inventor: Ju Min Ki, Wanju-Kun (KR)

(73) Assignee: LG Electronics Inc., Seoul (KR)

( * ) Notice: Subject to any disclaimer, the term of this patent is extended or adjusted under 35 U.S.C. 154(b) by 358 days.

(21) Appl. No.: 09/664,770

(22) Filed: Sep. 19, 2000

(30) Foreign Application Priority Data

Sep. 21, 1999 (KR) .......................... 1999-40589

(51) Int. Cl.⁷ ..................... G06F 3/00; G06F 13/14; G06F 15/00; G06F 15/16; H04N 7/14
(52) U.S. Cl. ..................... 710/107; 710/1; 710/30; 710/305; 712/34; 709/236; 348/14.04
(58) Field of Search ................. 710/1, 16, 20, 710/21, 30, 107, 305, 313; 712/220, 225, 34; 348/14.03, 14.04; 709/236; 386/46, 111, 14.04; 345/503

(56) References Cited

U.S. PATENT DOCUMENTS

| 5,570,085 A | 10/1996 | Bertsch ................. 340/825.07 |
| 2001/0028780 A1 * | 10/2001 | Na et al. ...................... 386/46 |

FOREIGN PATENT DOCUMENTS

| EP | 0608624 A2 | 8/1994 | |
| EP | 0853401 A2 | 7/1998 | |
| EP | 0893896 A2 | 1/1999 | |
| JP | 08161236 A * | 6/1996 | .......... G06F/12/16 |
| JP | 11-205363 | 6/1999 | |
| JP | 11-252093 | 9/1999 | |
| WO | WO 99/07114 | 2/1999 | |
| WO | WO 99/35787 | 7/1999 | |

* cited by examiner

Primary Examiner—Glenn A. Auve
Assistant Examiner—Trisha Va
(74) Attorney, Agent, or Firm—Fleshner & Kim, LLP

(57) ABSTRACT

The present invention relates to an apparatus and method for generating a command frame and/or a response frame transmitted and received to/from a digital equipment. The apparatus includes: a host processor for outputting a digital equipment code and operation control signal upon receipt of the signal outputted from the input unit; a frame processor for determining the type of the digital equipment upon receipt of the digital equipment code and operation control signal, and generating a command frame and/or response frame; and a digital interface processor for receiving the command and/or response frame and processing the same so as to be transmitted to the digital interface connecting the digital equipment. In the method for generating a command frame and/or a response, frame, there is an effect that a digital equipment must not be repeatedly programmed in order to generate a command frame and/or a response frame as in the conventional art.

12 Claims, 7 Drawing Sheets

FIG. 5A

| 0000 | COMMAND TYPE | SUBUNIT TYPE | SUBUNIT ID | OPCODE | OPERAND [0] |
|---|---|---|---|---|---|
| OPERAND [1] | | OPERAND [2] | | OPERAND [3] | OPERAND [4] |
| ...... | | | | | |
| OPERAND [n] | | PADDING(NULL) | | | |

FIG. 5B

| COMMAND TYPE ||
|---|---|
| VALUE | MEAN |
| 0 | CONTROL |
| 1 | STATUS |
| 2 | SPECIFIC INQUIRY |
| 3 | NOTIFY |
| 4 | GENERAL INQUIRY |
| 5~7 | RESERVED |

FIG. 6A

| 0000 | RESPONSE TYPE | SUBUNIT TYPE | SUBUNIT ID | OPCODE | OPERAND [0] |
|------|---------------|--------------|------------|--------|-------------|
| OPERAND [1] | | OPERAND [2] | | OPERAND [3] | OPERAND [4] |
| ..... | | | | | |
| OPERAND [n] | | PADDING(NULL) | | | |

FIG. 6B

| RESPONSE TYPE | |
|---|---|
| VALUE | MEAN |
| 8 | NOT IMPLEMENTED |
| 9 | ACCEPTED |
| $A_{16}$ | REJECTED |
| $B_{16}$ | INTRANSITION |
| $C_{16}$ | IMPLEMENTED/STABLE |
| $D_{16}$ | CHANGED |
| $E_{16}$ | RESERVED |
| $F_{16}$ | INTERIM |

FIG. 7

| SUBUNIT TYPE | |
|---|---|
| VALUE | MEAN |
| 0 | VIDEO MONITOR |
| 1~2 | RESERVED |
| 3 | DISC RECORDER/PLAYER |
| 4 | TAPE RECORDER/PLAYER |
| 5 | TUNER |
| 6 | RESERVED |
| 7 | VIDEO CAMERA |
| 8~1B$_{16}$ | RESERVED |
| 1C$_{16}$ | VENDOR UNIQUE |
| 1D$_{16}$ | RESERVED FOR ALL SUBUNIT TYPE |
| 1E$_{16}$ | EXTENDED SUBUNIT TYPE |
| 1F$_{16}$ | UNIT |

APPARATUS AND METHOD FOR GENERATING COMMAND AND/OR RESPONSE FRAME FOR CONTROL OF DIGITAL EQUIPMENT

BACKGROUND OF THE INVENTION

1. Field of the Invention

The present invention relates to an apparatus and method for generating a command frame and/or a response frame transmitted and received to/from a digital equipment connected to a digital interface, and more particularly, to an apparatus and method for generating a command frame and/or a response frame for the control of a digital equipment which is capable of easily generating a command frame and/or a response frame of a size appropriate for the digital equipment.

2. Description of the Background Art

Generally, a command frame and/or response frame transmitted and received to/from a digital equipment connected to a digital interface is generated in the form appropriate for the type of a digital equipment by searching command and/or response frame identification codes stored by means of a control signal according to the type of the digital equipment inputted by an user. The generated command and/or response frame is transmitted to the corresponding a digital equipment.

FIG. 1 is a block diagram illustrating a digital equipment connected to a digital interface according to the conventional art, wherein a variety of a digital equipment such as a digital VCR(D-VCR or D-VHS) 100, digital television(D-TV) 110, digital audio(D-Audio) 120, DVD(Digital Versatile Disc) recorder/reproducer 130 is connected to the above-said digital interface. Here, the IEEE 1394 is used as the digital interface.

FIG. 2 is a block diagram of parts of a digital VCR(D-VCR or D-VHS) 100 and digital television(D-TV) 110 connected to a digital interface according to the conventional art.

The above-said digital VCR 100 includes: a digital VCR processor 101 for receiving a signal inputted from the outside to process the same; a digital VCR program(D-VCR program) 102 constructed inside the digital VCR processor 101; a frame processing program 103 constructed inside the digital VCR program 102 for storing command and response frame formats according to the type of a digital equipment; and a digital interface processor (IEEE 1394 processor) 104 for generating the command and response frames appropriate for the digital equipment generated from the digital VCR processor 101 so as to be transmitted and received to/from a digital interface.

The above digital television(D-TV) 110 is constructed in the same manner as the above-described digital VCR 100.

The thusly constructed method for generating a command frame and response frame according to the conventional art will be described in detail.

When a signal for interfacing with the digital television 110 is inputted to the digital VCR 100, the inputted signal is transmitted to the digital VCR processor(D-VCR processor) 101. The digital VCR processor 101 determines the command and/or response frame appropriate for the type of a corresponding a digital equipment, among command and/or response frames according to the type of a digital equipment pre-stored in a frame processing program 103 of the D-VCR program 102 by means of the above inputted signal. The determined command and/or response frame is transmitted to the IEEE 1394 processor 104 to thus be generated in the form appropriate for the transmission to the digital television 110, and the generated command and/or response frame is transmitted through an asynchronous channel of the IEEE 1394. Meanwhile, generated or received video/data data is transmitted through an isochronous channel of the IEEE 1394.

In addition, the transmitted command and/or response frame is received from the IEEE 1394 processor 114 of the digital television 110. A digital TV processor 111 corresponding to the digital VCR processor 101 generate a command frame and/or a response frame in the same method as the above-described method for generating a command frame and/or a response frame for the digital VCR 100 to thus transmit the same to the asynchronous channel of the IEEE 1394, and the generated or received video/audio data is transmitted through the isochronous channel of the IEEE 1394.

However; the command and/or response frame transmitted/received through the asynchronous channel is previously standardized according to the type of a digital equipment. Therefore, the method for generating a command frame and/or a response frame according to the conventional art has a problem that each of the command frame and response frame related to the type of a digital equipment connected to a digital interface must be repeatedly programmed.

SUMMARY OF THE INVENTION

Accordingly, it is an object of the present invention to provide an apparatus and method for generating a command frame and/or a response frame transmitted and received to/from a digital equipment.

To achieve the above object, there is provided an apparatus for generating a command frame and/or a response frame for the control of a digital equipment according to the present invention which includes: an input unit for inputting a signal; a host processor for outputting a digital equipment code and operation control signal upon receipt of the signal inputted from the input unit; a frame processor for determining the type of the digital equipment upon receipt of the digital equipment code and operation control signal, and generating a command frame and/or a response frame; a storing unit for storing the code value of the command and/or response frame in relation to the type of the digital equipment; and a digital interface processor for receiving the command and/or response frame and processing the same so as to be transmitted to the digital interface connecting the digital equipment.

There is provided a method for generating a command frame and/or a response frame for the control of a digital equipment according to the present invention which includes the steps of: generating a digital equipment code and command control signal by means of a signal outputted from an input unit; determining the type of the digital equipment corresponding to the digital equipment code, and the command and/or response frame corresponding to the digital equipment; and processing the determined command and/or response frame in an appropriate form so as to be transmitted to a digital interface for thereby transmitting/receiving the same to/from an asynchronous channel of the digital interface.

BRIEF DESCRIPTION OF THE DRAWINGS

The present invention will become better understood with reference to the accompanying drawings which are given only by way of illustration and thus are not limitative of the present invention, wherein:

FIGS. 5A and 5B are explanatory views of a command frame format for transmitting/receiving through the digital interface according to the present invention;

FIGS. 6A and 6B are explanatory views of a response frame format transmitted/received through the digital interface according to the present invention;

FIG. 7 is an explanatory view illustrating the code value and meaning of a subunit type identifying the type of the digital equipment according to the present invention.

DETAILED DESCRIPTION OF THE PREFERRED EMBODIMENTS

The preferred embodiment of the present invention will now be described with reference to the accompanying drawings.

Figure 1:
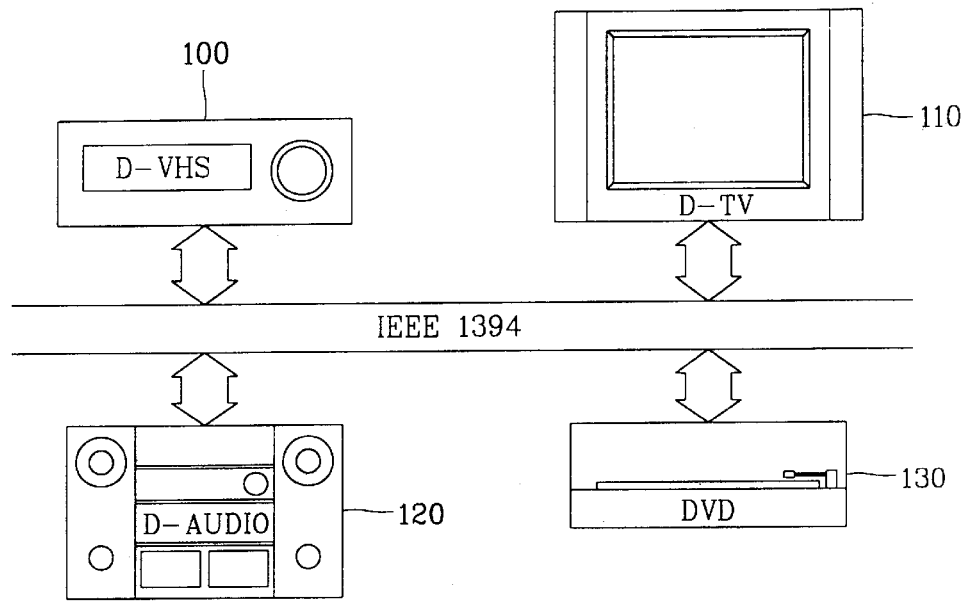
FIG. 1 is a block diagram illustrating a digital equipment connected to a digital interface according to the conventional art.
Figure 2:
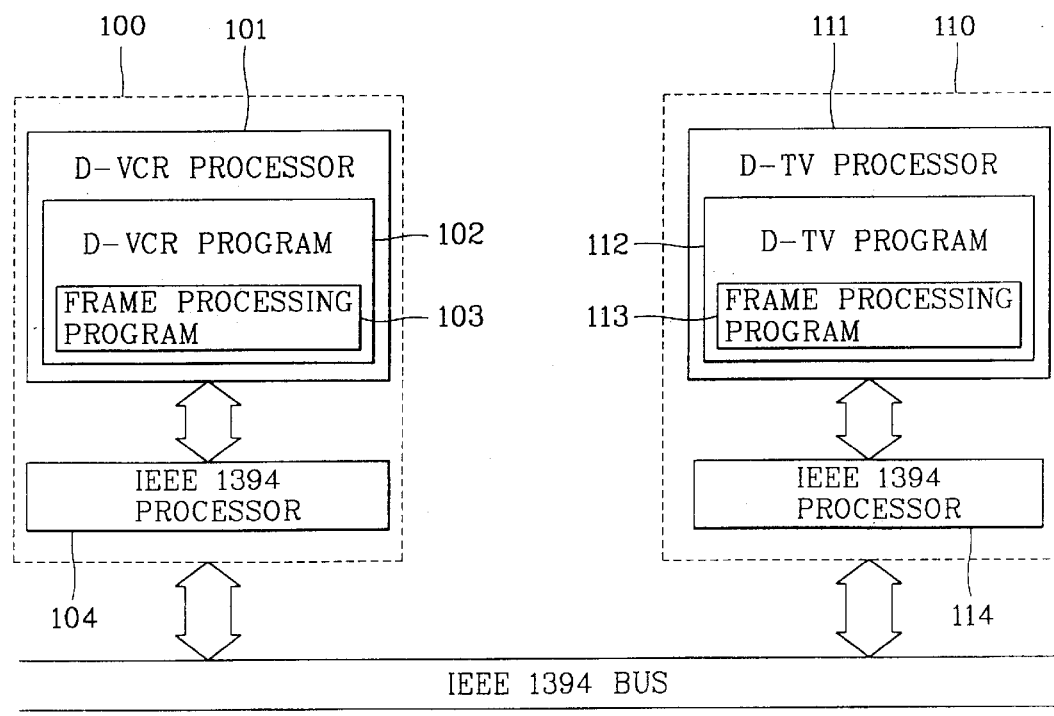
FIG. 2 is a block diagram of parts of a digital VCR(D-VCR or D-VHS) and digital television(D-TV) connected to a digital interface according to the conventional art.
Figure 3:
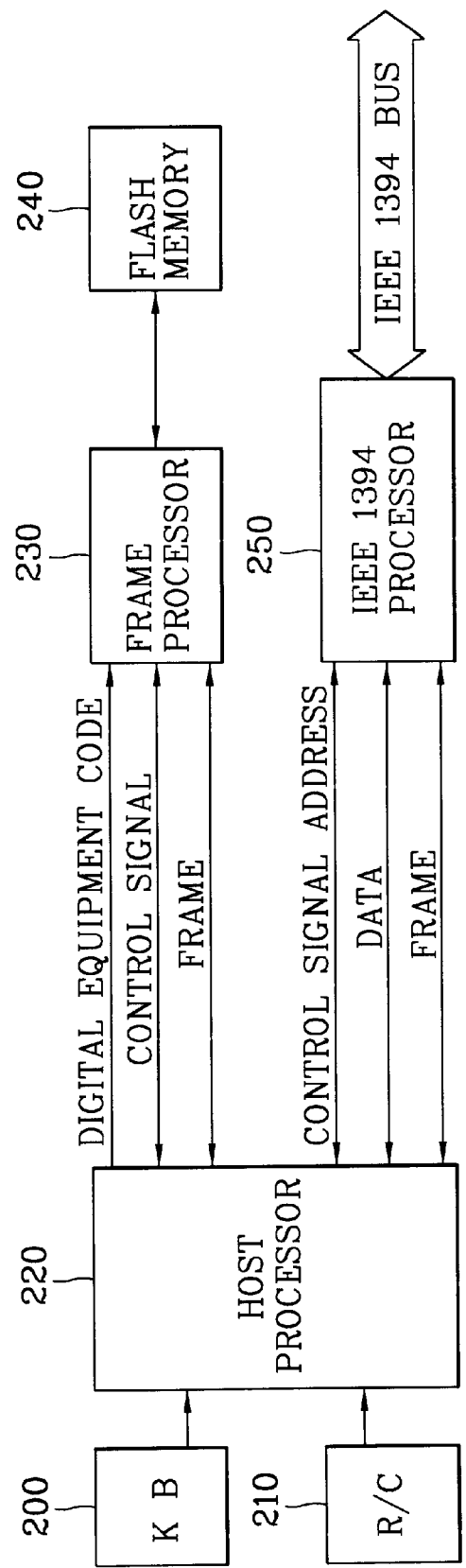
FIG. 3 is a block diagram illustrating an apparatus for generating a command frame and/or a response frame transmitted/received through a digital interface according to the present invention.

FIG. 3 is a block diagram illustrating an apparatus for generating a command frame and/or a response frame transmitted/received through a digital interface according to the present invention.

The apparatus includes: an input unit such as a keyboard 200 or remote control (R/C) 210 having a plurality of operation buttons; a host processor(main processor) 220 for outputting a digital equipment code and operation control signal upon receipt of a signal outputted from the input unit; a frame processor 230 for determining the type of a digital equipment and generating a command frame and response frame corresponding to the digital equipment upon receipt of the digital equipment code and operation control signal; a digital interface processor 250 for receiving the command frame and response frame and processing the same so as to be transmitted to the digital equipment connected to the digital interface; and a flash memory 240 for storing information on the format of the type of a digital equipment besides an internal memory of the frame processor 230.

The operation of the thusly constructed apparatus of the present invention will be explained by taking the IEEE 1394 as an example.

First, when an user inputs a signal for interfacing with ascertain particular to the input unit, a host processor(main processor) 220 receives the inputted signal from the outside, and outputs a digital equipment code and operation control signal to the frame processor 230.

The frame processor 230 determines the type of a digital equipment by means of an identification value recorded in the field of subunit type to be described in FIG. 7, which corresponding to the received code value of the digital equipment.

By the determined a digital equipment, a command frame and/or a response frame corresponding to the type of the corresponding a digital equipment is determined by searching command and/or response frames pre-stored in the memory, and is transmitted to the host processor(main processor) 220. The command and/or response frame inputted to the host processor(main processor) 220 is outputted to the IEEE 1394 processor 250, and the outputted command and/or response framed is processed in such a manner that it is transmitted to the IEEE 1394, and is transmitted and received to/from an asynchronous channel of the IEEE 1394.

Meanwhile, the video/audio data reproduced or received from the host processor(main processor) 220 is transmitted and received through an isochronous channel of the IEEE 1394.

At this time, the command and/or response frame generated, from the frame processor 230 can be directly transmitted to the IEEE 1394 processor 250.

Figure 4:
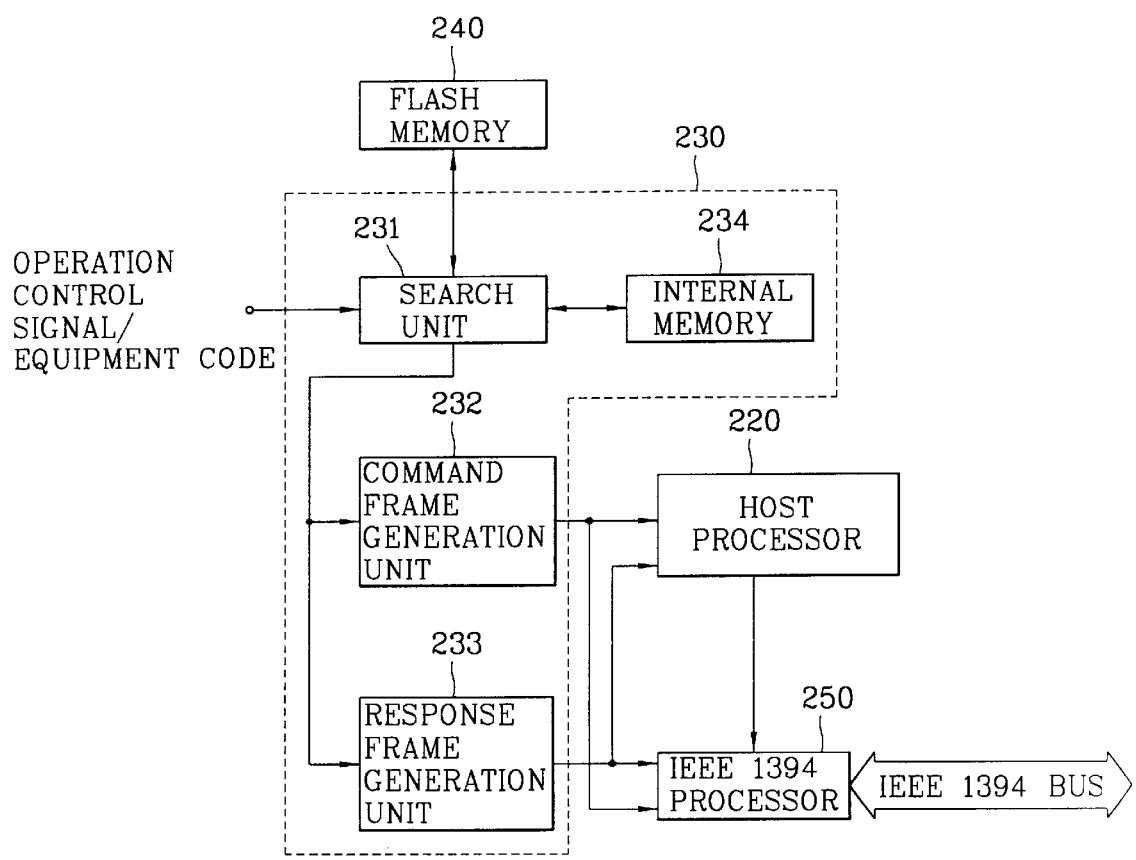
FIG. 4 is a detailed block diagram illustrating parts of the apparatus for generating a command frame and/or a response frame transmitted/received through the digital interface according to the present invention.

FIG. 4 is a detailed block diagram illustrating parts of the apparatus for generating a command frame and/or a response frame transmitted/received through the digital interface according to the present invention.

The frame processor 230 includes: a search unit 231 for searching for a certain particular code value stored in relation to the type of a digital equipment corresponding to a digital equipment code and operation control signal inputted from the host processor(main processor) 220; a storing unit for storing the code value of a command frame and/or a response frame; a command frame generation unit 232 for generating a command frame using the searched code value; and a response frame generation unit 233 for generating a response frame using the searched code value.

The storing unit includes an internal storing unit 234 of the frame processor 230 and an extra flash memory 240. At this time, even if there is no internal storing unit 234 of the frame processor 230 in the storing unit, it is possible to perform the same operation as that of the internal storing unit 234 by means of the extra flash. memory 240 alone.

The above-described method for generating a command frame and/or a response frame according to the present invention will now be described in detail.

When a digital equipment code value and operation control signal is inputted from the host processor(main processor) 220, the search unit 231 determines the type of a digital equipment corresponding to the inputted code of the digital equipment from an identification value recorded in the field of subunit type stored in the storing unit, and detects the code value of the command and/or response frame corresponding to the determined type of the digital equipment among command and/or response frames stored in the storing unit.

The detected code value of the command frame is transmitted to the command frame generation unit 232 to thus be generated in the form appropriate for the digital equipment connected to the digital interface. The detected code value of the response frame is also transmitted to the response frame generation unit 233 to thus be generated in the form appropriate for the digital equipment connected to the digital interface, in the same manner as the above-described method for generating a command frame.

The generated command and/or response frame is transmitted to the host processor(main processor) 220, or the IEEE 1394 processor 250 to thus be transmitted and received to/from other digital equipment through an IEEE 1394 cable.

FIGS. 5A and 5B is an explanatory view of a command frame format for transmitting/receiving through the digital interface according to the present invention.

FIG. 5A illustrates a command frame format, which includes: a command type field for identifying a command frame; a subunit type field and subunit ID field for identifying the type of a digital equipment; an operation code (Opcode) field; a plurality of operand fields; and a padding region in which, if necessary, unnecessary data (Null='0') is padded.

FIG. 5B illustrates code values (0~7) recorded in the command type field, which are identified as Control, Status, Specific Inquiry, Notify, General Inquiry, and Reserved, respectively.

FIGS. 6A and 6B are explanatory views of a response frame format transmitted/received through the digital interface according to the present invention.

FIG. 6A illustrates a response frame format, which includes: a response type field for identifying a response frame; a subunit type field and subunit ID field for identifying the type of a digital equipment; an operation code (Opcode) field; a plurality of operand fields; and a padding region in which, if necessary, unnecessary data (Null='0') is padded.

FIG. 6B illustrates code values (8~$F_{16}$) recorded in the response type field, which are identified as Not Implemented, Accepted, Rejected, Intransition, Implemented/Stable, Changed, Reserved, and Interim, respectively.

FIG. 7 is an explanatory view illustrating the code value and meaning of a subunit type identifying the type of the digital equipment according to the present invention.

The code values (0~$1F_{16}$) of the subunit type are identified as Video Monitor, Reserved, Disc Recorder/Player, Tape Recorder/Player, Tuner, Reserved, Video camera, Reserved, Vendor Unique, Reserved for all Subunit Types, Extended Subunit Type, and Unit, respectively.

Figure 8:
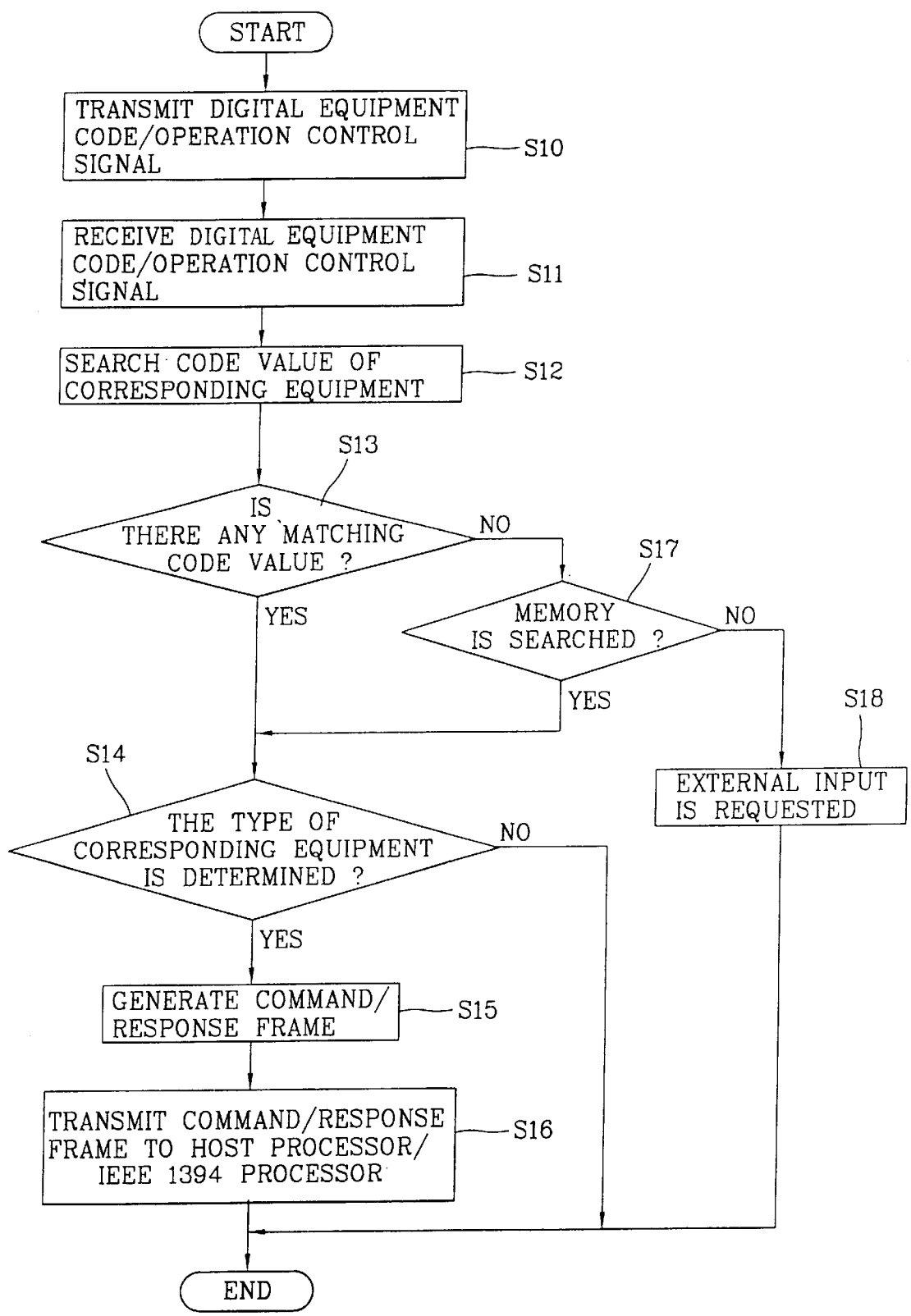
FIG. 8 is a flow chart illustrating a method for generating a command frame and/or a response frame transmitted/received through the digital interface according to the present invention.

FIG. 8 is a flow chart illustrating a method for generating a command frame and/or a response frame transmitted/received through the digital interface according to the present invention.

The host processor(main processor) 220 generates a digital equipment code and operation control signal upon receipt of a signal outputted from the input unit for thereby transmitting S10 the same to the frame processor 230. The search unit 231 of the frame processor 230 receives S11 the digital equipment code and operation control signal, and searches S12 for the code value corresponding to the digital equipment code in the internal memory 234 inside the frame processor, thus determining the type of the corresponding a digital equipment.

At this time, if the code value of the corresponding a digital equipment is not stored in the internal memory 234 of the frame processor, the extra flash memory is searched S17 for the corresponding code value, thereby determining the type of the digital equipment. The flash memory 240 can store data in addition to the code values related to the digital equipment later.

Afterwards, when the type of the digital equipment is determined S14 by the above operation, the internal memory 234 of the frame processor or the flash memory 240 detects the code value of the corresponding command and/or response frame.

The detected code value is generated S15 in the command and response frame generation unit in the form appropriate for the corresponding a digital equipment, and is transmitted to the host processor(main processor) 220 or the IEEE 1394 processor 250.

Accordingly, the command and/or response frame is processed so as to be transmitted from the IEEE 1394 processor 250 to the IEEE 1394 cable, and then is transmitted and received to/from other digital equipment through the asynchronous channel of the IEEE 1394.

As described above, in the apparatus and method for easily generating a command frame and/or a response frame transmitted/received through the asynchronous channel of the digital interface according to the present invention, there is an effect that the digital equipment must not be repeatedly programmed in order to generate a command frame and/or a response frame as in the conventional art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus, connected to a network, for generating one of a command frame and a response frame for control of a digital equipment, comprising:

a first processor configured to output a code of the digital equipment and an operation control signal upon receipt of an input signal inputted from an input unit;

a second processor configured to search an identification value of a type of the digital equipment and a code value of the one of the command frame and the response frame corresponding to the type of the digital equipment stored in a memory upon receipt of the code of the digital equipment and the operation control signal so as to determine the type of the digital equipment and generate the one of the command frame and the response frame corresponding to the searched code value, wherein the memory is configured to store the identification value of the type of digital equipment and the code value of the one of the command frame and the response frame; and a digital interface for receiving and processing the one of the command frame and the response frame so as to be transmitted to the network connecting the digital equipment.

2. The apparatus of claim 1, wherein the second processor comprises:

a command frame generation unit for generating the command frame using the searched code value; and a response frame generation unit for generating the response frame using the searched code value.

3. The apparatus of claim 2, wherein the memory comprises an internal memory of the second processor and an extra flash memory.

4. The apparatus of claim 3, wherein the memory performs the same operation as that of the internal memory by means of the extra flash memory alone.

5. The apparatus of claim 4, wherein the flash memory additionally stores the code value of the one of the command frame and the response frame for the digital equipment later.

6. The apparatus of claim 1, wherein the network is an IEEE 1394 network.

7. The apparatus of claim 1, wherein the one of the command frame and the response frame is an audiovisual control frame.

8. An apparatus for generating one of a command frame and a response frame of an audiovisual control frame for control of a digital device connected to an IEEE 1394 network, comprising:

a first processor configured to output a code of the digital device and an operation control signal upon receipt of an input signal received from an input unit;

a memory configured to store a plurality of identification values that identify a type of digital device and a plurality of code values of command frames and response frames corresponding to each type of a plurality of digital devices;

a second processor configured to search an identification value of the digital device and a code value of the one of the command frame and the response frame corresponding to the digital device stored in the memory upon receipt of the code of the digital device and the operation control signal, and to generate the one of the command frame and the response frame corresponding to the searched code value; and a digital interface configured to receive and process the one of the command frame and the response frame, and transmit the one of the command frame and the response frame to the IEEE 1394 network.

9. The apparatus of claim 8, wherein the second processor directly transmits the one of the command frame and the response frame to the digital device using the IEEE 1394 network.

10. The apparatus of claim 9, wherein the search and generation of the one of the command frame and the response frame by the second processor reduces a response time of the first processor for at least one processor operation.

11. The apparatus of claim 8, wherein the second processor directly transmits the one of the command frame and the response frame to the IEEE 1394 network without using the first processor.

12. The apparatus of claim 8, further comprising a second digital device having the first processor and the second processor therein, the second digital device communication with the digital device using the one of the command frame and the response frame.

* * * * *